(12) United States Patent
Weber

(10) Patent No.: US 11,390,348 B2
(45) Date of Patent: Jul. 19, 2022

(54) CARGO REVERSED TRICYCLE APPARATUS AND METHOD

(71) Applicant: Michael Weber, New Orleans, LA (US)

(72) Inventor: Michael Weber, New Orleans, LA (US)

( * ) Notice: Subject to any disclaimer, the term of this patent is extended or adjusted under 35 U.S.C. 154(b) by 582 days.

(21) Appl. No.: 16/140,415

(22) Filed: Sep. 24, 2018

(65) Prior Publication Data
US 2020/0094903 A1 Mar. 26, 2020

(51) Int. Cl.
*B62K 7/02* (2006.01)
*B62K 5/08* (2006.01)
*B62K 5/05* (2013.01)

(52) U.S. Cl.
CPC .............. *B62K 7/02* (2013.01); *B62K 5/05* (2013.01); *B62K 5/08* (2013.01)

(58) Field of Classification Search
CPC ... B62K 7/02; B62K 5/05; B62K 5/06; B62K 5/08
See application file for complete search history.

(56) References Cited

U.S. PATENT DOCUMENTS

| D113,888 S * | 3/1939 | Wilcox | |
|---|---|---|---|
| 4,070,032 A * | 1/1978 | Cunningham | B62K 3/12 280/202 |
| 4,277,078 A * | 7/1981 | Root | B62K 5/05 280/269 |
| 4,469,344 A * | 9/1984 | Coil | B62K 5/05 280/269 |
| 4,740,004 A * | 4/1988 | McMullen | B62K 5/05 280/124.103 |
| 4,863,183 A * | 9/1989 | Hwang | B62K 5/05 280/267 |
| 4,903,857 A * | 2/1990 | Klopfenstein | B62K 5/05 280/267 |
| 4,917,396 A * | 4/1990 | Meneses | B62K 5/05 280/267 |
| D406,554 S | 3/1999 | Challoner et al. | |
| 6,161,860 A * | 12/2000 | Comeau | A61H 3/04 135/67 |
| 6,953,203 B2 * | 10/2005 | Wilcox | B62K 3/005 280/282 |
| 9,174,693 B2 | 11/2015 | Godlewski | |
| 9,394,027 B2 * | 7/2016 | Serpa | B62K 5/05 |
| D805,002 S | 12/2017 | Anthony | |
| 2007/0290470 A1 | 12/2007 | Taylor | |

* cited by examiner

*Primary Examiner* — Jacob D Knutson
(74) *Attorney, Agent, or Firm* — AdamsIP, LLC

(57) ABSTRACT

A cargo reversed tricycle apparatus and method providing an open front, allowing the encompassing of cargo and a low center of weight when carrying, allowing more options in loading, transporting, and unloading and improved stability and maneuverability. A front-open frame provides cargo space between the front wheels, and allows for a variety of ways to load, transport, and unload the cargo. A dual-crossed-drag-link steering arrangement is provided, where a drag-link driver linked to the handlebar pushes and pulls shaped link rods, which transfer the forces through pivot links on turning bars on the two front-wheel units, which thereby turn in the intended direction.

15 Claims, 10 Drawing Sheets

CARGO REVERSED TRICYCLE APPARATUS AND METHOD

BACKGROUND

This invention provides a cargo reversed tricycle apparatus and method providing an open front, allowing the encompassing of cargo and a low center of weight when carrying, allowing more options in loading, transporting, and unloading and improved stability and maneuverability.

The types of cargo cycles presently available have a number of drawbacks. For instance, some cargo cycles are unstable because loads are carried with a too-high center of gravity, or the cargo area is substantially just a basket-type arrangement cantilevered off the cycle frame. In specific instances where cargo is carried at the front, with its weight burden on the steering, it might also impede the ability to steer and maneuver safely. The use of three cycle wheels is often seen, which may provide more stability than a bicycle, but where two wheels are placed in the back—they are of no advantage in steering—and when placed in the front, there arises problems of allowing the two wheels to steer together, and with cargo weight concentrated above the front wheels, above the level of the axles, and directly on the steering portion of the cycle, the above mentioned problems of steering and maneuvering safely arise.

Moreover, present cargo cycles are unable to enfold or encompass cargo to be loaded, transported, or unloaded; and cycle-based transport often does not have access to forklifts or other lifts, loading docks, and other support seen in motor transport.

The prior art does not provide for a reversed tricycle for cargo, providing the advantages of the two-wheels-in-front arrangement but also avoiding the described disadvantages; and having an open-front design for optimum loading, transport, and unloading.

For example, U.S. Design Pat. No. D113,888 for a "Design for a Tricycle," issued on Mar. 21, 1939 to inventor Ralph R. Wilcox, Jr., provides for the ornamental design shown therein.

U.S. Pat. No. 4,917,396 for a "Tricycle," issued on Apr. 17, 1990 to inventors Sabino Meneses et al., provides for a tricycle that includes a frame mounting a single large diameter rear wheel and a pair of small diameter front wheels. A pedal crank mechanism is connected through a chain and sprocket to drive the single rear wheel. The front wheels are mounted on front fork members disposed at opposite ends of a transverse steering bar. A perpendicular attached steering rod extends through a head tube on the tricycle frame and connects with a handle bar having an elongated central portion extending parallel with the transverse steering bar. A rectangular basket is disposed forwardly of the steering rod and includes a pair of spaced parallel vertically extending corner frame members secured between the central handle bar portion and the transverse steering bar.

U.S. Pat. No. 4,740,004 for a "Three Wheeled Cycle with Load Carrying Basket," issued on Apr. 26, 1988 to inventor Wayne W. McMullen, provides for a tricycle having two front steering wheels and its rear drive wheel has a frame for accommodating the rear wheel and a mount pivotally connected to the front of the frame carrying a pair of front steering wheels. Handle bars are connected with a tie-rod assembly to the supporting forks for the front steering wheels. The mount has a parallel linkage which allows the frame and the front wheels to bank to facilitate the turning of the tricycle. A basket is suspended below the mount between the front wheels. A lock connected to the beams holds the beams in fixed relation relative to each other. The lock can be released to limit the angle of the bank of the tricycle.

U.S. Pat. No. 4,277,078 for a "Three-Wheel Conveyance," issued on Jul. 7, 1981 to inventor Myron A. Root, provides for a conversion kit for converting a two-wheel conveyance, such as a bicycle, into a three-wheel conveyance that includes a connecting member which provides two wheel fork assemblies equally spaced on opposite sides of the plane of the rear wheel, a center steering member having two arms arranged in a "V" shape and being attached to the center post of the bicycle and supporting the handlebars, and two four-bar linkage arrangements each including an arm, a rod member and a link member, one such four-bar linkage being coupled to each wheel fork assembly. The two linkages couple turning movement of the handlebars into turning movement of the front steering wheels wherein the front steering wheel to the inside of the turning path of the conveyance is turned through a greater angle than the front steering wheel to the outside of the turning path for the same amount of turning movement of the center steering member.

U.S. Design Pat. No. D406,554 for a "Tricycle Frame," issued on Mar. 9, 1999 to inventor Lewis Challoner et al., provides for the ornamental design shown therein.

U.S. Design Pat. No. D805,002 for a "Multimedia Bike," issued on Dec. 12, 2017 to inventor Frederick Anthony, provides for the ornamental design shown therein.

U.S. Patent Application Publication No. 2007/0290470 for a "Tricycle and Steering Mechanism Therefor," published on Dec. 20, 2007 by inventor Luther Taylor, discloses a human-powered, wheeled vehicle, comprising: two front wheels, each of the two front wheels pivotally coupled to a frame by a pivoting mount; one or more rear wheels, one or more of the rear wheels coupled to a drive mechanism and operative to provide a driving force for the vehicle; and a steering mechanism coupled to said front wheels, the steering mechanism including a handle for steering control by a driver of the vehicle, a first linkage connecting the handle to a first one of the pivoting mounts and a second linkage connecting the first one of the pivoting mounts to a second one of the pivoting mounts.

Lastly, U.S. Pat. No. 9,174,693 for a "Three-Wheeled Cycle," issued on Nov. 3, 2015 to assignee Standard Bearer Machines, LLC, provides for a three-wheeled cycle that can be ridden in an upright position. The cycle can have a suspension system for traversing rough terrain and for traction when turning. The front wheels can have a steering assembly comprised of a two-piece steering arm that clamps the handlebar to the front fork and connection rod with linkage pins.

SUMMARY OF THE INVENTION

This invention provides a cargo reversed tricycle apparatus and method providing an open front, allowing the encompassing of cargo and a low center of weight when carrying, allowing more options in loading, transporting, and unloading and improved stability and maneuverability.

A front-open frame provides cargo space between the front wheels, and allows for a variety of ways to load, transport, and unload the cargo. A dual-crossed-drag-link steering arrangement is provided, where a drag-link driver linked to the handlebar pushes and pulls shaped link rods, which transfer the forces through pivot links on turning bars on the two front-wheel units, which thereby turn in the intended direction.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
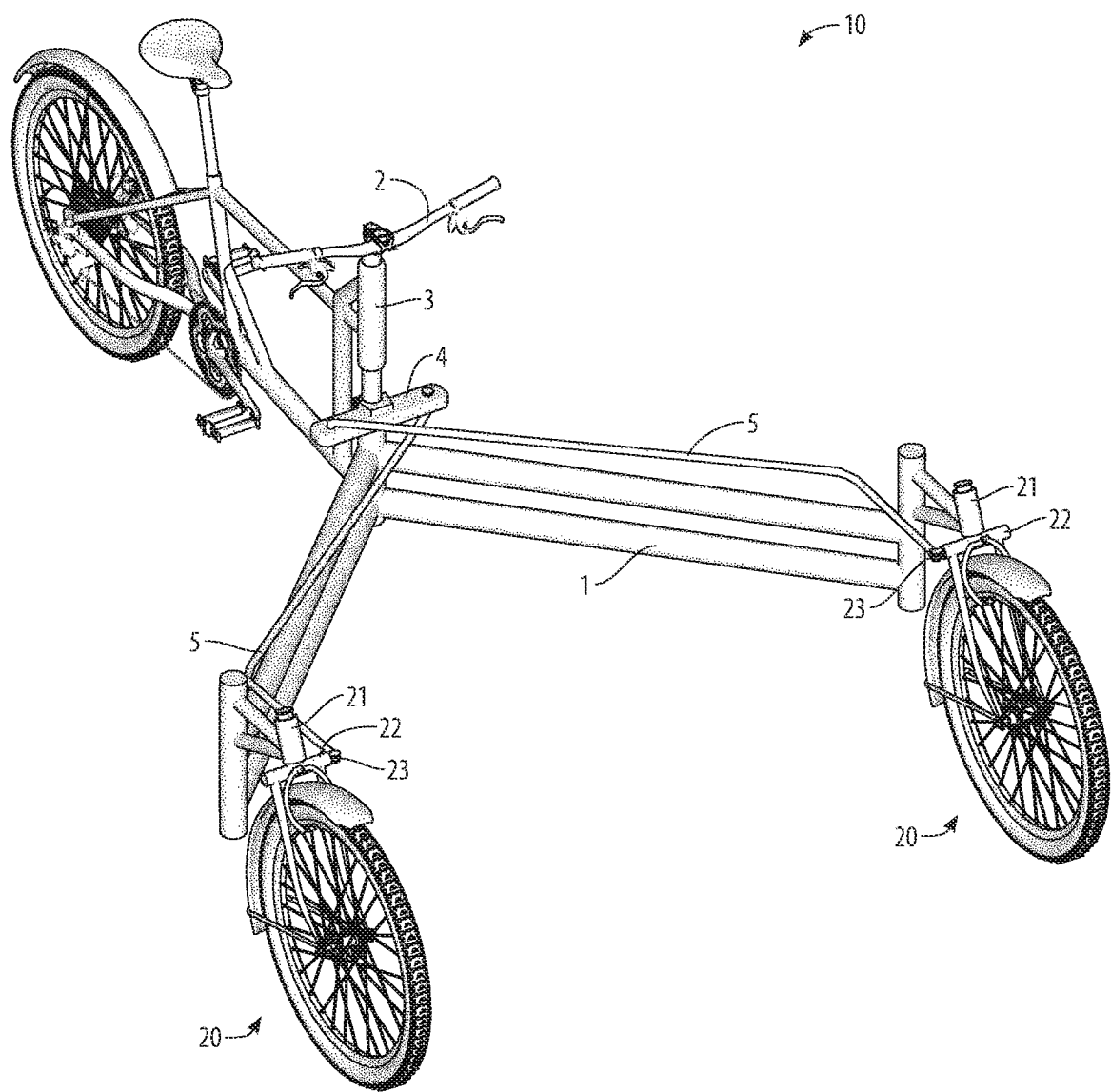
FIG. 1 is a perspective view of the cargo reversed tricycle of the invention in a first embodiment.

Referring to FIG. 1, an embodiment of the cargo reversed tricycle 10 of the invention is shown. A front-open frame 1 is provided at the forward end of a pedaled cycle, such as is seen in a bicycle. The cargo reversed tricycle 10 is also useful at the forward end of a motorized cycle such as a motor-scooter or motorcycle. The front-open frame 1 of this embodiment forms a 90-degree angle, or is V-shaped, while other embodiments can provide a more open, more U-shaped configuration.

A handlebar 2 with a descending shaft is mounted to the front-open frame 1 through a steering bearing 3 which allows the handlebar 2 to be turned. A drag-link driver 4 is attached to the descending shaft of the handlebar 2, and therefore rotates with the manipulation of the handlebar 2. Two shaped link rods 5 are pivotally attached to horizontally opposite ends of the drag-link driver 4 and are variously pushed and pulled by the drag-link driver 4 with the turning of the handlebar 2.

Two front-wheel units 20 are provided, pivotally attached to the forward ends of the front-open frame 1 by turning bearings 21 within which the front wheels can turn. Turning bars 22 connect the forks attached at the axle on either side of each cycle wheel, and turning of the turning bars 22 will turn the front-wheel units 20. The turning bars 22 have a substantially horizontal orientation and have two horizontally opposite ends. On an end of each turning bar 22 is a pivot link 23 which attaches to the free end of a shaped link rod 5, forming a link between an end of the drag-link driver 4 and an end of a turning bar 22. The turning force applied to the handlebar 2 is thereby transferred to the turning bars 22, which turn the front-wheel units 20 correspondingly.

The cargo reversed tricycle 10 uses a dual-crossed-drag-link steering arrangement, as is treated in detail below.

Figure 2:
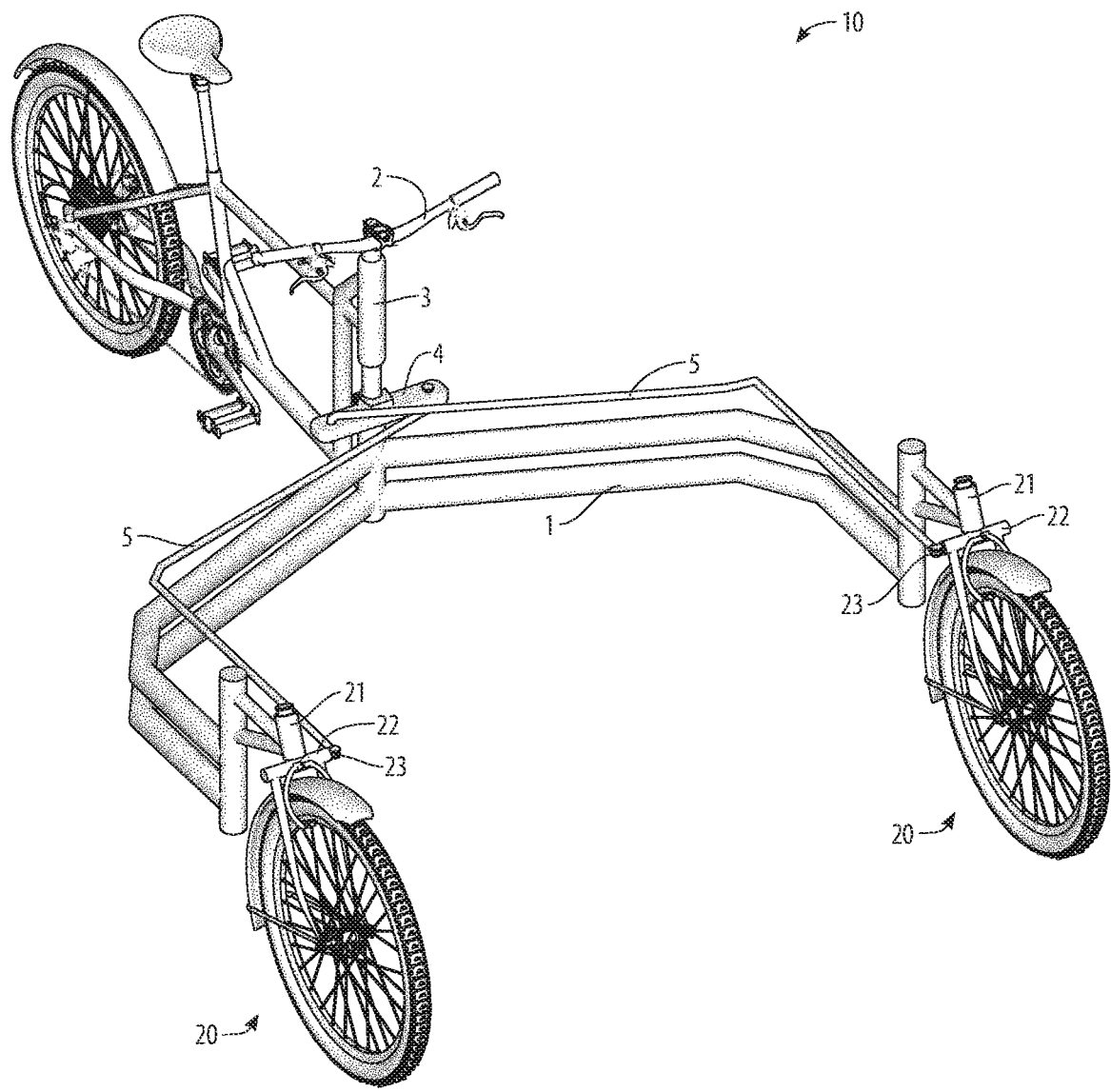
FIG. 2 is a perspective view of the cargo reversed tricycle of the invention in a second embodiment.

Referring to FIG. 2, a second embodiment of the cargo reversed tricycle 10 has a front-open frame 1 which opens more, sooner, than does the 90-degree front-open frame 1 of the first embodiment, providing an approximately 120-degree opening at the apex, providing additional space to accommodate cargo down to ground level, if needed, or on a platform set on the front-open frame 1. The shaped link rods 5 for this embodiment conform generally to the front-open frame 1.

Figure 3:
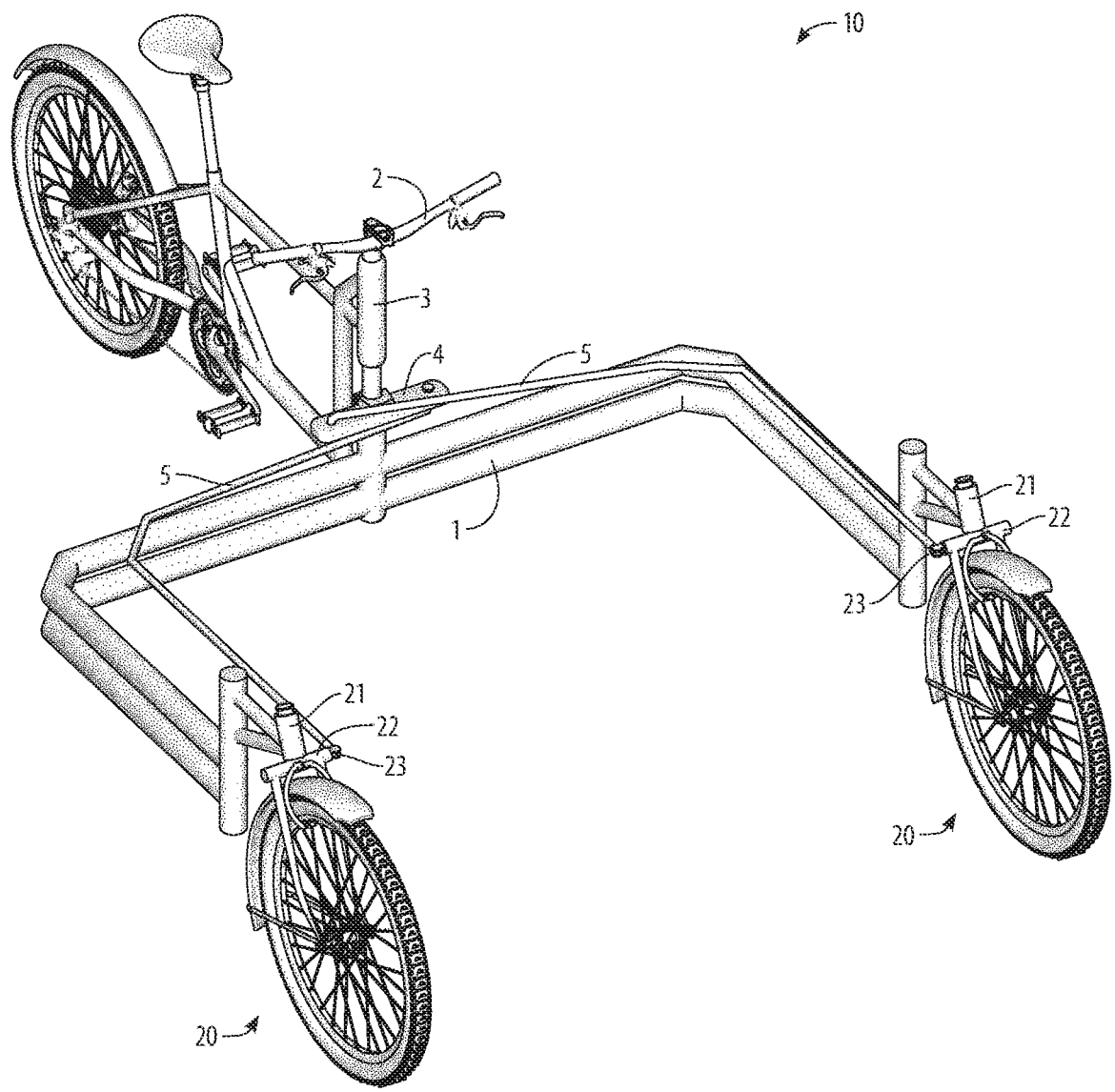
FIG. 3 is a perspective view of the cargo reversed tricycle of the invention in a third embodiment.

Referring to FIG. 3, a third embodiment of the cargo reversed tricycle 10 has a front-open frame 1 which opens at an approximately 180-degree angle, providing even more space to accommodate cargo. The shaped link rods 5 for this embodiment conform generally to the front-open frame 1.

Figure 4:
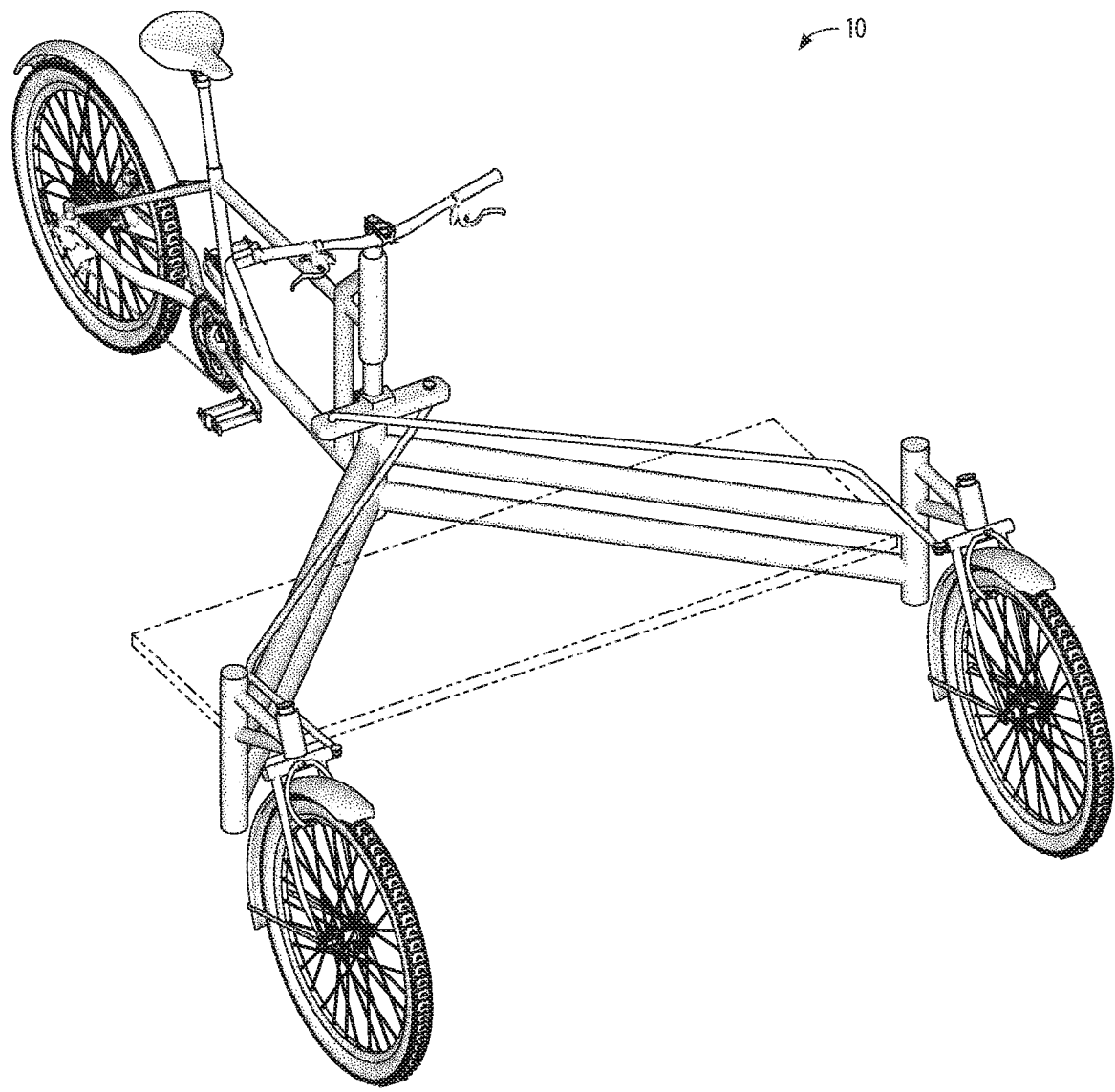
FIG. 4 is a perspective view of an embodiment of the cargo reversed tricycle of the invention, in use, with a cargo shelf.

Referring to FIG. 4, cargo can be supported on a shelf or a floor mounted on the front-open frame 1 in a variety of changeable ways.

Figure 5:
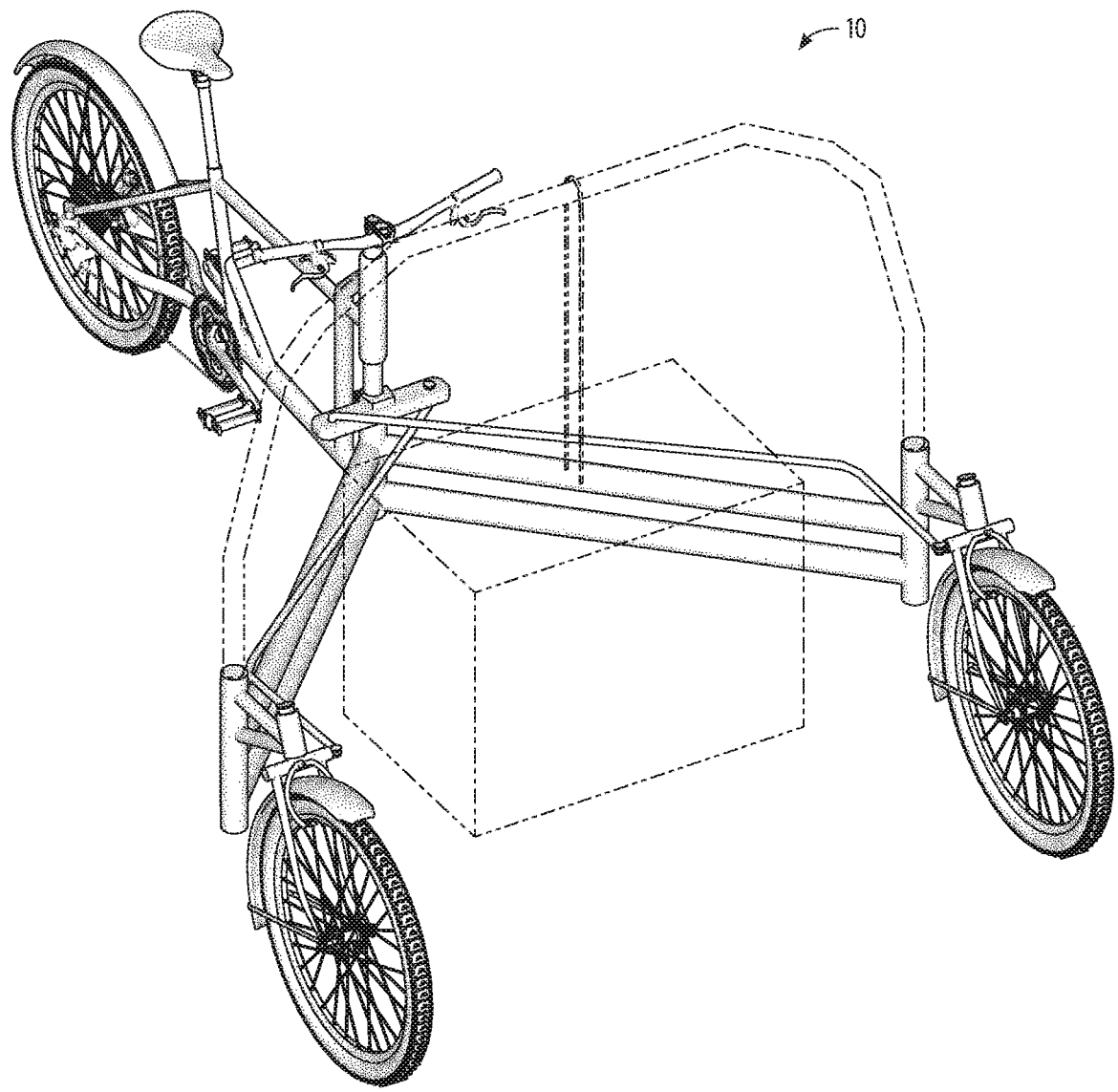
FIG. 5 is a perspective view of an embodiment of the cargo reversed tricycle of the invention, in use, with suspended cargo.

Referring to FIG. 5, cargo can be supported by suspension from an extension attached to the front-open frame 1, as illustrated. Where needed, the cargo reversed tricycle 10 can encompass a load within the open space of the front-open frame 1 and lift it and lower it onto an exact spot, such as for pick-ups and deliveries of heavy cargo where no separate forklift or other lifting is available. The load can be carried very low to the ground, if it needs to be.

Figure 6:
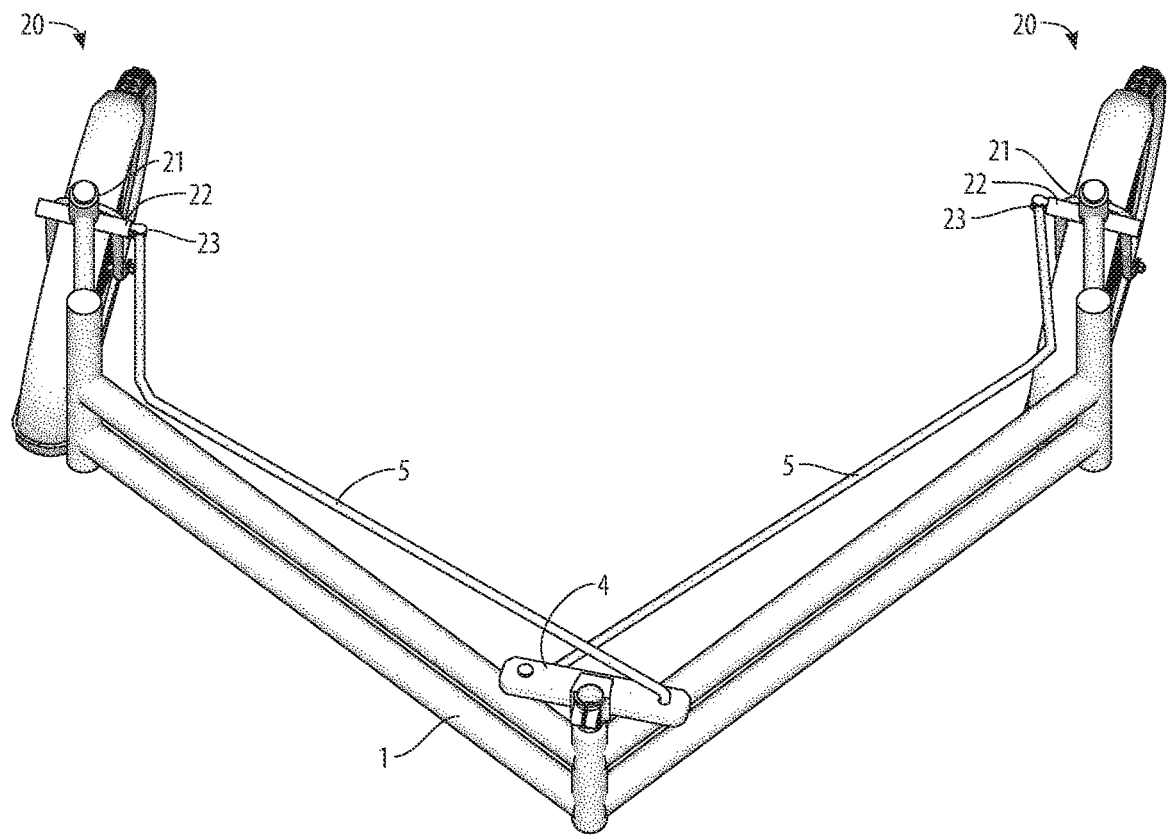
FIG. 6 is a detailed view of the front of an embodiment of the cargo reversed tricycle of the invention.

Referring to FIG. 6, a dual-crossed-drag-link steering arrangement is provided by the cargo reversed tricycle 10. Movement is in reference to the front-open frame 1, upon which the drag-link driver 4 is rotatably fixed at the apex, and each front-wheel unit 20 is rotatably fixed at the front ends. The shaped link rods 5 are shaped to generally conform to the front-open frame 1, so that they do not encroach upon the open cargo space. The shaped link rods 5 should be made of material, such as steel, carbon fiber, composites, or the like to resist further bending in use which would fail to transfer the force as intended. The pivot link 23 of the turning bar 22 of the nominally left front wheel is linked by a shaped link rod 5 to the nominally right end of the drag-link driver 4. The right front wheel is linked to the left end or the drag-link driver 4. The two shaped link rods 5 therefore cross over each other. In order to avoid the shaped link rods 5 rubbing against each other, one rod can be brought over the drag-link driver 4 and the other can be brought under, at the points of attachment, separating the rods by at least the thickness of the drag-link driver 4.

Figure 7:
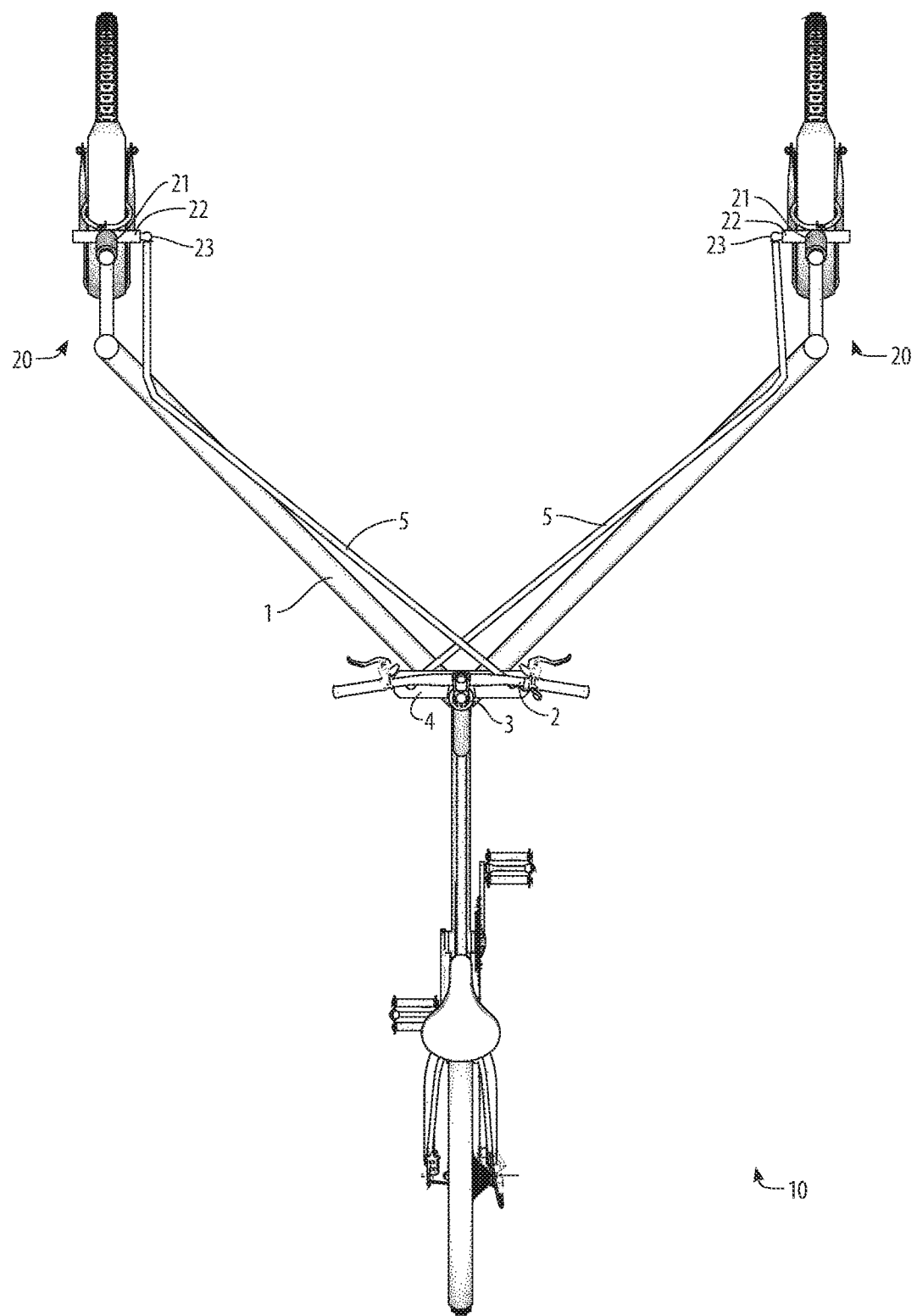
FIG. 7 is a top view of an embodiment of the cargo reversed tricycle of the invention, in use, steering straight ahead.
Figure 8:
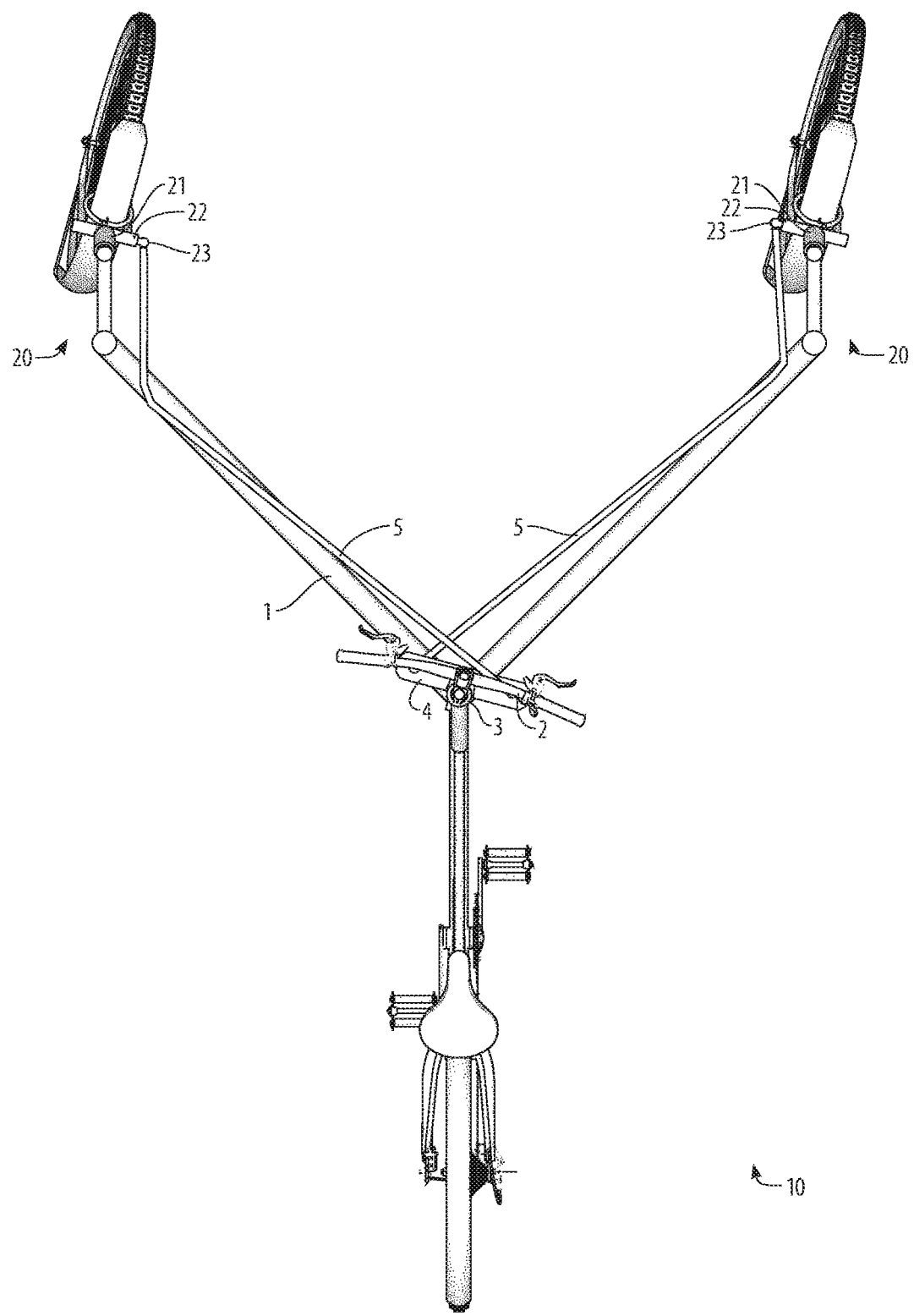
FIG. 8 is a top view of an embodiment of the cargo reversed tricycle of the invention, in use, steering to the right.

Referring additionally to FIG. 7 and FIG. 8, in use, as illustrated, when making a nominally right turn, the right end of the drag-link driver 4 pulls on the right end of the turning bar 22 of the left front-wheel unit 20, through a shaped link rod 5, causing the left front-wheel unit 20 to turn to the right. Simultaneously, the left end of the drag-link driver 4 pushes on the left end of the turning bar 22 of the right front-wheel unit 20, through a shaped link rod 5, causing the right front-wheel unit 20 to turn to the right. For a nominally left turn, the opposite happens, and the shaped link rods 5 need to withstand both pushing and pulling forces in alternation.

Figure 9:
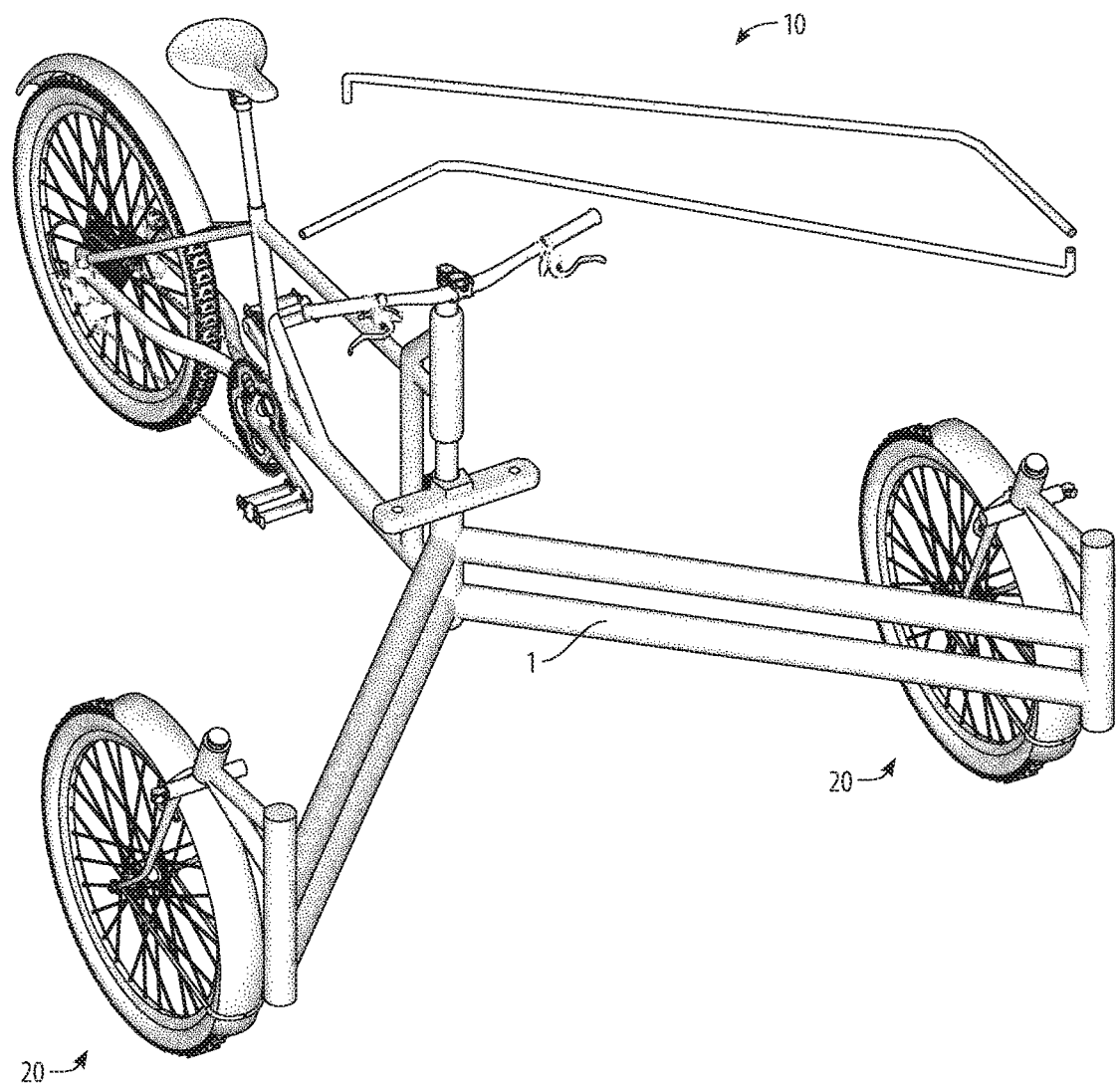
FIG. 9 is a perspective view of an embodiment of the cargo reversed tricycle of the invention allowing reverse-positioning of the front wheels after disconnection of the shaped link rods.

Referring to FIG. 9, optionally, the front-open frame 1 can be made to allow the pivoting back of the front-wheel units 20—resulting in a "reverse-positioning" of the front wheels relative to the above described embodiments. This option might be useful in situations requiring a very close approach to an obstacle such as a building.

Figure 10:
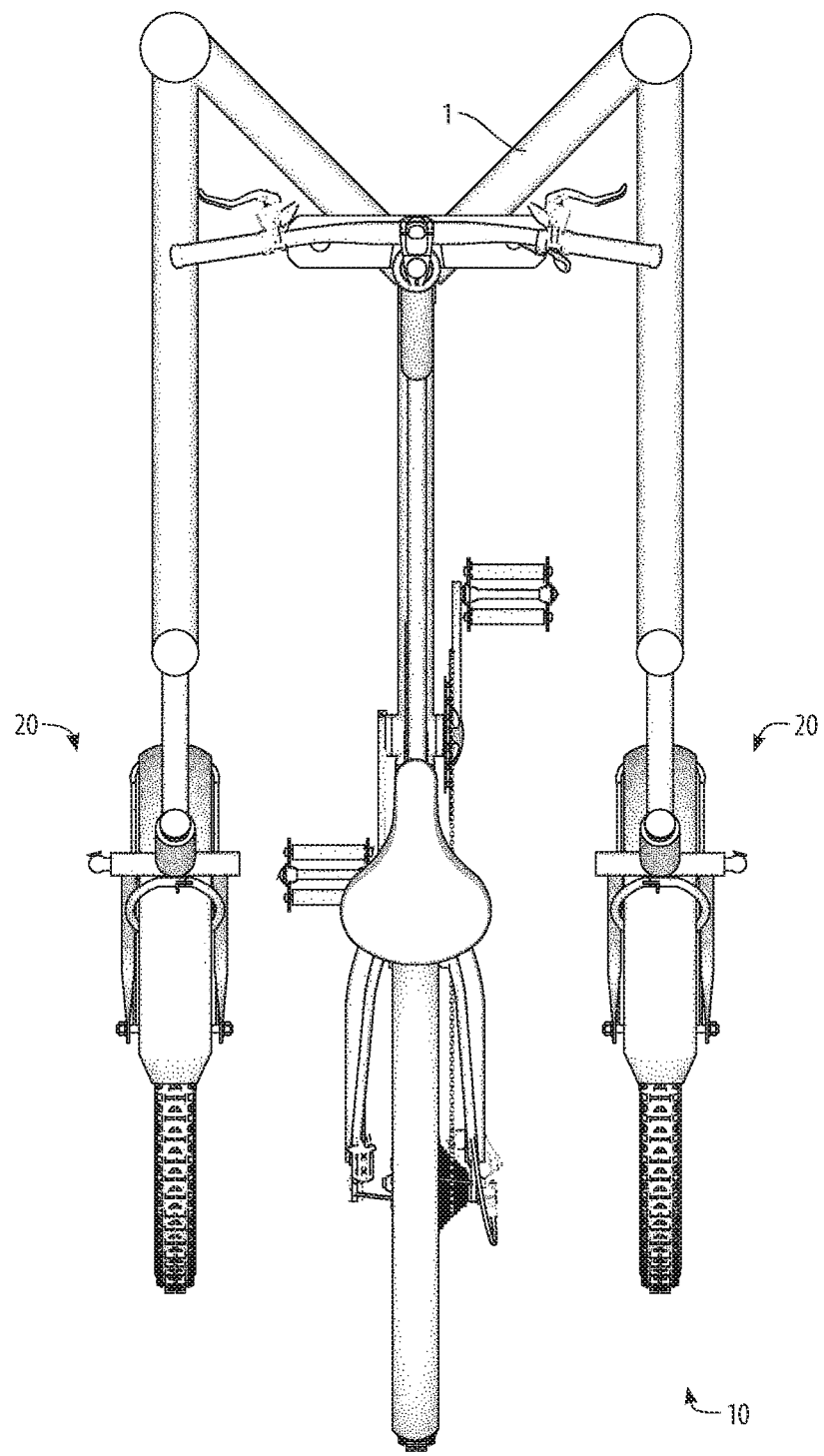
FIG. 10 is a top view of an embodiment of the cargo reversed tricycle of the invention allowing reverse-positioning of the front frame and front wheels.

Likewise, referring to FIG. 10, optionally, the front-open frame 1 can be made to allow the pivoting back of a substantial amount of the frame and the attached front-wheel units 20—resulting in a "reverse-positioning" of the front frame and front wheels relative to the above described embodiments. Such an option would allow easier storage and transport of the cargo reversed tricycle 10.

Many other changes and modifications can be made in the apparatus and method of the present invention without departing from the spirit thereof. I therefore pray that my rights to the present invention be limited only by the scope of the appended claims.

I claim:

1. A tricycle apparatus having a forward and a rearward orientation that define a forward direction toward a forward end of the apparatus and a rearward direction toward a rearward end of the apparatus, the apparatus comprising:
   two opposing front wheel assemblies each mounted onto a frame, and
   a handlebar having a descending shaft mounted onto the frame at a center joint,
   wherein the frame comprises two opposing arms each attached to the center joint and each extending horizontally from the center joint toward the forward end of the apparatus,
   wherein a forward end of each horizontal arm is attached to an ascending wheel frame member, wherein a respective one of the front wheel assemblies is mounted onto a respective one of the ascending wheel frame members,
   wherein the horizontal arms extend forward such that a rearward end of a front wheel of a respective one of each of the front wheel assemblies is positioned forward of the descending shaft of the handlebar,
   wherein the forward end of the apparatus is open such that an area between the two opposing front wheel assemblies is free of obstruction, wherein the area free of obstruction encompasses a space that extends an entire length between the front wheel assemblies in a lateral direction from the rearward end of each of the front wheels to a forward end of each of the front wheels and from a bottom end of each of the front wheels to a top end of each of the front wheels, and wherein the area free of obstruction extends upwardly from the space between the front wheel assemblies along the entire length between the front wheel assemblies in the lateral direction from the rearward end to the forward end of each of the front wheels, and
   wherein each horizontal arm extending between the center joint and one of the wheel frame members is positioned lower than an upper end of each of the front wheels.

2. The apparatus of claim 1, wherein the two opposing arms extend from the center joint to each respective wheel frame member at a 90 degree angle to each other.

3. The apparatus of claim 1, wherein the two opposing arms extend from the center joint at an angle greater than 90 degrees to each other, wherein each arm is angled toward the forward end of the apparatus.

4. The apparatus of claim 1, wherein each of the two opposing arms extend in a straight line from the center joint to each respective wheel frame member, wherein the arms define a substantially V-shaped angle.

5. The apparatus of claim 1, wherein the two opposing arms extend from the center joint at an angle greater than 90 degrees to each other, wherein the arms define a substantially U-shaped compound angle.

6. The apparatus of claim 1, wherein each front wheel is positioned forward of each ascending wheel frame member.

7. The apparatus of claim 6, wherein the rearward end of each front wheel is positioned forward of each ascending wheel frame member.

8. The apparatus of claim 1, wherein the frame further comprises third and fourth opposing arms each attached to the center joint and each extending horizontally from the center joint toward the forward end of the apparatus, wherein two of the four horizontal arms extend toward a left side of the apparatus, wherein two of the four horizontal arms extend toward a right side of the apparatus, wherein a forward end of each of the two horizontal arms that extend toward the left side is attached to a first one of the ascending wheel frame members, wherein a forward end of each of the two horizontal arms that extend toward the right side is attached to a second one of the ascending wheel frame members, wherein the two arms that extend toward the left side of the apparatus include a left upper arm that is positioned directly above a left lower arm having the same shape as the left upper arm, and wherein the two arms that extend toward the right side of the apparatus include a right upper arm that is positioned directly above a right lower arm having the same shape as the right upper arm.

9. The apparatus of claim 1, further comprising a support bar having two opposing ends each attached to the frame at the forward end of the apparatus, wherein the support bar is positioned forward of the descending shaft of the handlebar, wherein the support bar has an arched shape that arches above the open area that is free of obstruction between the two opposing front wheel assemblies.

10. The apparatus of claim 9, wherein each end of the support bar is attached to an upper end of one respective wheel frame member.

11. The apparatus of claim 1, further comprising a steering bearing that supports the handlebar and allows turning of the handlebar such that the shaft of the handlebar turns within the center joint.

12. The apparatus of claim 11, further comprising a drag-link driver fixedly attached to the descending shaft of the handlebar such that the drag-link driver turns when the handlebar is turned.

13. The apparatus of claim 12, wherein the drag-link driver has two opposing ends, wherein the apparatus further comprises two shaped link rods each having two opposing ends, wherein one end of each shaped link rod is attached to one respective opposing end of the drag-link driver, wherein the opposing end of each shaped link rod is attached to one respective front wheel assembly, and wherein each of the shaped link rods is shaped to substantially conform to a shape of one respective arm of the two opposing arms of the frame such that the shaped link rods do not obstruct the open area between the two opposing front wheel assemblies.

14. The apparatus of claim 13, wherein each front wheel assembly comprises a turning bearing mounted onto one respective wheel frame member, wherein the turning bearing is attached to a wheel fork, wherein the wheel fork is attached at two ends of the wheel fork to opposing ends of an axle of the front wheel of the front wheel assembly, wherein one respective link rod is attached to the wheel fork of the front wheel assembly at a pivot link.

15. The apparatus of claim 1, wherein each of the two opposing arms include a hinge configured to pivot the forward end of each arm and each front wheel assembly toward the rearward end of the apparatus when the apparatus is not in use.

* * * * *